United States Patent Office 3,118,280
Patented Jan. 21, 1964

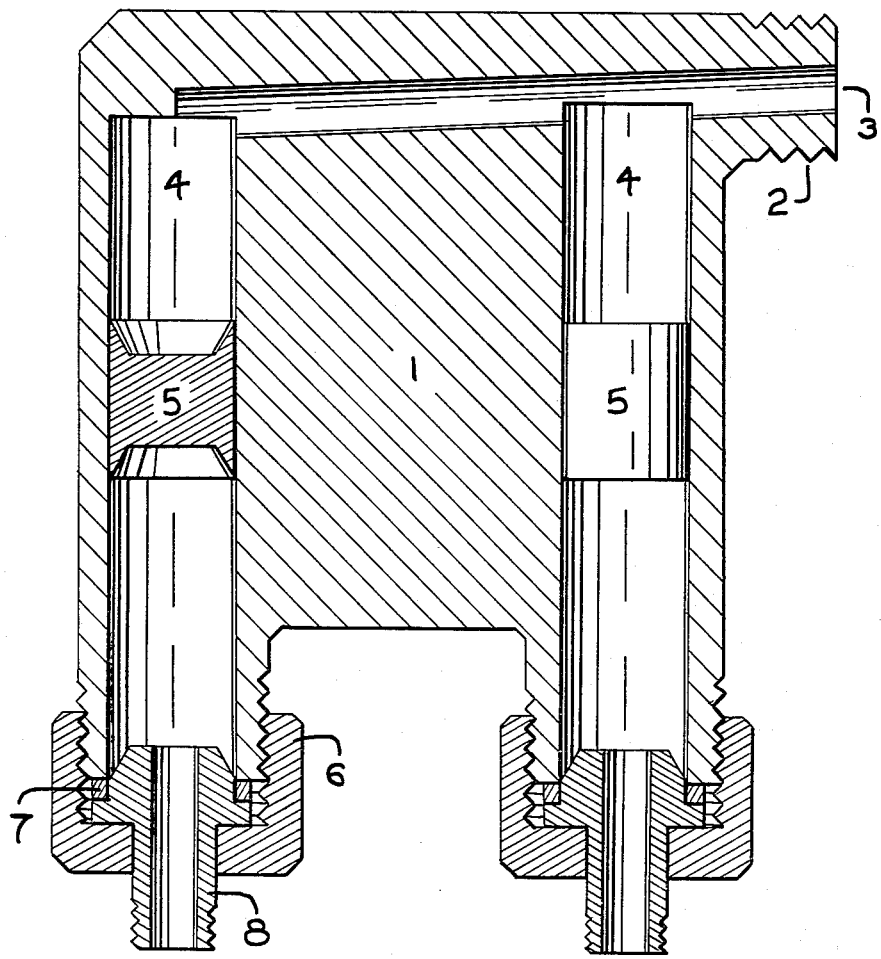

3,118,280
LOW FLOW HYDRAULIC SYSTEMS SUCH AS AUTOMOTIVE BRAKING MECHANISMS
Gus Schreiber, 3993 Northwest Highway, Dallas, Tex.
Filed Jan. 16, 1962, Ser. No. 166,656
1 Claim. (Cl. 60—54.5)

My invention consists of a piston-containing two-cylindered equalizer which is interposed between the outlet of the master cylinder and the brake lines, the front wheel brakes being connected to one cylinder of the equalizer, the rear wheel brakes being connected to the remaining cylinder. As will be shown, the function of the equalizer is not only to prevent complete loss of braking action should an abnormal loss of fluid occur in a brake line or wheel cylinder, but also to continuously effect an equal hydraulic function to all wheel brake cylinders despite normal lining wear and despite normal loss of brake fluid. It will also be shown that this equalizer does not reduce the capacity of flow of the brake fluid through the mechanism and that it does not necessitate any increased braking force on the master cylinder piston for its proper operation. My simple mechanism is very economical of production, is easily understood by mechanics, is a lifesaving accessory for existing automobiles—and it can be integrated into the master cylinder of future vehicles.

As shown in the drawing my mechanism consists of a casting 1 which might be of transparent material in which two vertical cylinders 4 are drilled. These two vertical cylinders are connected freely to each other and to the master cylinder by a sloping passageway with the highest elevation being at the open end of this passageway, allowing thereby for gravity bleeding of air bubbles to occur to the master cylinder and hence to its reservoir. In each vertical cylinder 4 a piston 5 carrying a packing element in each end, is free to oscillate in each cylinder. The volume of each cylinder with the piston in place should be slightly less than 50% of the volume of the master cylinder reservoir. A displacer connector 8 and sealing washer 7 is held firmly by means of the threaded collar 6 which is applied to each vertical cylinder. The top of each displacer connector 8 is designed to closely approximate the bottom packing element of each piston 5 and its other end is threaded to receive hydraulic connections, which after being tightened need not be loosened. This displacer connector 8, because of its close fit to the lower packing element, serves both as a stop for the piston above it and, as will be shown, by its displacer design prevents entrapment of air beneath the packing element. The casting is threaded 2 for attachment to the outlet of the master cylinder. Not illustrated is that each such hydraulic connection then divides by means of a T so that one cylinder is connected to the front wheel brake cylinders and the remaining cylinder of the equalizer is connected to the rear wheel brake cylinders.

At present the braking systems of automobiles are bled free of air by pumping the master cylinder and allowing the fluid to escape at loosened hydraulic connections or valves adjacent to the upper wheel cylinders of each wheel in rotation. Such an action requires the services of two mechanics. Since most master brake cylinders have a higher elevation than these wheel brake cylinder connections this method of expressing air bubbles is illogical and frequently requires repeated efforts to successfully remove the air from the brake lines.

The simplicity and effectiveness of my new equalizer utilizes the more logical retrograde injection of the hydraulic fluid at the wheel brake cylinder valves, the fluid being injected with a glass syringe or other transparent device to be sure that no air is injected. Such a retrograde injection pushes the air up the conduits permitting a perfect bleeding.

After my device is assembled with the hydraulic lines attached to the threaded ends of connectors 8, each threaded collar 6 is partially loosened allowing a leakage of fluid and/or air to occur across the top of connector 8, the washer 7, and the collar 6 when the retrograde injection is performed.

With the master cylinder reservoir filled and its cap removed the brake pedal is pumped until resistance is encountered, at which time both equalizer pistons will be at the lower end of their cylinders and stopped by the displacer connectors. The brake pedal is then blocked in the applied position. At this time it will be noted that both pistons are not only in their lowest possible position, they both have air free brake fluid above them as far as the piston crown of the master cylinder.

The next procedure is designed to both bleed the peripheral brake lines and to elevate each piston 5 to the top of each cylinder 4 without any air being left in the fluid beneath the pistons. Both collars 6 are still loose. The right front wheel is injected until no more air escapes with the fluid exuding from the related collar, then the injection is discontinued and the wheel cylinder valve is closed. Then the left front wheel is similarly injected but after all of the air is ejected past the related collar 6, this collar is tightened, the brake pedal block is removed, and additional fluid is injected at the wheel brake cylinder valve until no more is accepted. A few drops of fluid are then allowed to escape and the wheel cylinder valve is closed. This procedure has now raised one piston to the top of its cylinder and it has air-free fluid both above and below its packing elements. The brake pedal is again depressed and blocked and the procedure is repeated with the rear wheels, thereby elevating the remaining piston to the top of its cylinder.

When the filling and bleeding methods are summarized their simplicity becomes evident:

(1) Both of the collars 6 are loosened moderately and the master cylinder reservoir is uncapped and the reservoir is filled.

(2) The brake pedal is pumped until resistance is normal, and then it is blocked in the position of brake application.

(3) A retrograde injection at the right front wheel brake valve is performed until no more air exudes with the fluid escaping from the involved collar, then this wheel brake valve is closed.

(4) A retrograde injection of the left front wheel brake valve is performed until no more air escapes around this same loose collar, then the collar is tightened while fluid is being exuded, the pedal block is removed, and the injection continued until resistance is felt, a few drops are allowed to escape from the wheel valve and then this wheel valve is closed.

(5) The brake pedal is again depressed and blocked and procedures 3 and 4 above are reepated on the right and left rear wheels.

(6) The cap of the master cylinder reservoir is replaced.

Each cylinder of the displacer is designed with a high volume capacity so as to provide an excess of brake fluid beneath each piston. This high capacity of volume allows the downward movement of each piston whether this downward movement is due to normal braking action, or due to increased length of stroke from brake lining wear, or due to a lower resting position because of normal losses of fluid beneath each piston. In the latter case it may be noted that as a lower resting position occurs the fluid above each piston is replaced from the master cylinder reservoir.

Of course the above functions occur in a conventional braking system without an equalizer interposed in the hydraulic lines but it is obvious that these functions must not be disturbed while the purpose of the equalizer is being accomplished. This purpose is to prevent the complete loss of braking action due to a major fluid leak at any point distant to the equalizer. When such a major leak occurs, the pressure on the bottom of the related piston disappears and the piston falls to the bottom of its cylinder at which point it is stopped by the displacer connector, the piston then, by its plugging action prevents any further loss of fluid from the equalizer, the master cylinder, or the remaining hydraulic system. Since the remaining cylinder and its piston are not affected, this remaining cylinder continues to function, producing thereby an effective braking action to the related set of wheel brakes.

What I claim that is new and useful in my invention is:

In a hydraulic braking system utilizing a conventional brake pedal operated master cylinder with hydraulic lines connected to conventional wheel brake cylinders, an equalizer is interposed between the master cylinder and the hydraulic lines to the wheel brake cylinders; said equalizer consisting of two vertically positioned cylinders, the tops of said equalizer cylinders being connected to each other and to the master cylinder by an upward sloping conduit; the bottom of one equalizer cylinder being connected by hydraulic lines to the front wheel brake cylinders and the bottom of the second equalizer cylinder being connected to the rear wheel brake cylinders; each equalizer cylinder containing a piston to which a conventional concave shaped packing element has been attached to both the upper and lower ends of each piston; the bottom or lower end of each equalizer cylinder being closed by means of a displacer connector, the upper end of said displacer connector being shaped in a convex manner to fit the concavity of the lower packing element attached to the piston containing with said equalizer cylinder; the lower end of the displacer connector being threaded for hydraulic tubing connection; said displacer connector and sealing washer being maintained in position by means of a threaded collar, such a construction of the threaded collar and sealing washer serving to act as a temporary escape valve allowing the reverse bleeding of the brake lines in a slightly loosened position, yet sealing the system when this collar is tightened while the brake fluid is exuding past the washer during the bleeding process.

References Cited in the file of this patent

UNITED STATES PATENTS

| | | |
|---|---|---|
| 2,140,027 | Myllyniemi | Dec. 13, 1938 |
| 2,166,747 | Best | July 18, 1939 |
| 2,529,306 | Morris | Nov. 7, 1950 |
| 2,585,511 | Sparks et al. | Feb. 12, 1952 |
| 2,752,939 | Sikora | July 3, 1956 |